Dec. 7, 1937. W. FERRIS ET AL 2,101,495
HYDRAULIC TRANSMISSION
Filed Oct. 23, 1935 3 Sheets-Sheet 1

Fig. 1.

INVENTORS
WALTER FERRIS
JAMES K. DOUGLAS
GEORGE H. FOBIAN
BY
ATTORNEY.

Patented Dec. 7, 1937

2,101,495

UNITED STATES PATENT OFFICE 2,101,495

HYDRAULIC TRANSMISSION

Walter Ferris and James K. Douglas, Milwaukee, and George H. Fobian, West Allis, Wis., assignors to The Oilgear Company, Milwaukee, Wis., a corporation of Wisconsin Application October 23, 1935, Serial No. 46,328

27 Claims. (Cl. 257—7)

This invention relates to a hydraulic transmission which is driven from a turnable part of a vehicle, such as the axle of a refrigerator car, and which is employed to operate apparatus for controlling the temperature within the vehicle, such as the hydraulic transmission disclosed in application Serial No. 673,018 filed May 26, 1933 of which this application is a continuation as to matters common to both applications.

Refrigerator cars are often employed to carry cargoes the temperature of which should be maintained within a narrow range. In order to maintain the temperature of the car within that range, it is necessary to cool the car during warm weather and to heat it during cold weather.

The above application shows a hydraulic transmission applied to a refrigerator car which may be cooled by mechanical refrigerating apparatus and heated by circulating heated oil through a heating coil. A variable displacement pump supplies oil either as a heating agent to the heating coil or as motive liquid to a rotary hydraulic motor which drives the compressor of the refrigerating apparatus. The delivery of oil to the hydraulic motor and to the heating coil is controlled by electromagnetically operated valves under the control of thermostatically operated electric switches. The electric current for energizing the electromagnets which operate those valves is supplied from a storage battery which is kept charged by a small generator.

The pump is driven from the car axle so that its speed and volumetric delivery vary in accordance with variations in car speed. In order that the compressor of the refrigerating apparatus may reach its rated speed at a low car speed and not exceed its rated speed at high car speeds, the pump has its displacement varying element urged toward full stroke position by springs and urged in the opposite direction by a hydraulic servo-motor which is actuated in response to variations in the velocity of the liquid flowing in the circuit. Consequently, when the car is stationary, the pump stroke is maximum.

If the car should remain stationary for a considerable period of time in subzero weather with the pump at full stroke, the oil in the pump would become so thick and stiff that, when the car was moved, the belts which drive the pump from the car axle would slip.

The present invention has as an object to provide an improved transmission of the character described.

Another object is to provide a transmission of the above character which may be readily started regardless of temperature.

Another object is to provide means which are operable whenever the transmission is in operation for supplying electric current to operate the electric controls without the aid of a storage battery.

Other objects and advantages will appear from the description hereinafter given of a hydraulic transmission in which the invention is embodied.

According to the invention in a general aspect and as ordinarily embodied in practice, the variable displacement pump is driven from the car axle and delivers oil either to a heating coil or to a hydraulic motor which drives the compressor of the refrigerating apparatus. The pump has its stroke-changing element urged toward zero stroke position by a spring and toward full stroke position by a hydraulic servo-motor which is operated by liquid supplied by an auxiliary pump, and the servo-motor is actuated in response to variations in the velocity of the liquid delivered by the variable displacement pump.

According to the invention in another aspect, electric fans which circulate air over or through the heating and cooling units and the electromagnets which operate the valves are energized by electric current supplied thereto by a generator driven by an auxiliary hydraulic motor which is connected in series with the main hydraulic motor, and the speed of the auxiliary motor is limited by by-passing all liquid in excess of the liquid required to drive the auxiliary motor at a predetermined speed through a speed controller which operates in response to variations in the velocity of the liquid flowing in the circuit.

The invention is exemplified by the hydraulic transmission shown schematically in the accompanying drawings in which the views are as follows.

The transmission is shown as being employed to supply oil as a heating agent to the heating coils and to operate the refrigerating apparatus of a refrigerator car of which only a heating coil 1 and the compressor 2 of the refrigerating apparatus are shown for the reason that the heating and cooling apparatus form no part of the present invention.

If the car needs to be cooled, the compressor is driven by a rotary hydraulic motor 3 when the car is in transit and by an electric motor 4 when the car is stationary. Current for operating the electric motor 4 may be supplied thereto from a stationary electric circuit through two conductors 5 and 6 which are connected to the motor 4 and provided at the outer ends thereof with a connector 7 for connection to the stationary electric circuit as by means of a portable connector 8.

The compressor 2 and the hydraulic motor 3 are shown as being direct-connected by shafting 9 to which the electric motor 4 is geared so that, when the compressor is driven by the hydraulic motor, the rotor of the electric motor rotates idly and functions as a flywheel and, when the compressor is driven by the electric motor, the hydraulic motor is also driven and functions as a pump.

Liquid for driving the hydraulic motor 3 is supplied by a variable displacement pump 10 which is driven from the axle of the car so that the pump is idle when the car is stationary and is driven in one direction or the other when the car is in transit, depending upon the direction of car movement.

In order to clearly illustrate the hydraulic circuit, the several parts of the transmission are shown separated from each other but, in practice, the pump and the motor 3 are arranged in a single casing and the several valves which control the operation of the apparatus are arranged in a casing mounted upon the pump and motor casing as shown in the application referred to above.

The channels which connect the several parts of the transmission consist in part of pipes and in part of channels formed in the casing of the pump and motor and in the casing of the control unit. For the purpose of explanation, however, they will be referred to herein as pipes.

The pump 10 is provided with a displacement varying slide block 11 which is at all times urged in a direction to decrease pump displacement by two springs 12 and which, when the pump is in operation, is urged in a direction to increase pump displacement by a hydraulic servo-motor the piston 13 of which is connected to the slide block 11 and fitted in a cylinder 14 formed in a casing 15 which is ordinarily a part of the pump casing. The arrangement is such that the springs 12 can move the slide block to its zero stroke position as soon as the pump ceases to operate.

The pump 10 has a pipe 16 and a pipe 17 connected thereto. When the car is in transit, the pump discharges liquid into one of these pipes and has liquid returned to it through the other pipe depending upon the direction of car movement and the resultant direction of pump actuation.

The pipes 16 and 17 are connected, respectively, through check valves 18 and 19 to one end of a supply pipe 20 and through check valves 21 and 22 to one end of a return pipe 23. The check valves permit liquid to flow from either the pipe 16 or the pipe 17 into the supply pipe 20 and from the return pipe 23 into either the pipe 16 or the pipe 17 but prevent it from flowing in the opposite direction in order that the pump may deliver liquid into the pipe 20 and have liquid returned to it through the pipe 23 in either direction of pump actuation.

The supply pipe 20 has its other end connected to the casing of a selector valve 24 in communication with an annular port 25 formed therein between two similar ports 26 and 27. Liquid discharged by the pump 10 is directed by the selector valve 24 either to the heating coil 1 or to a control valve 28 which controls the delivery of liquid to the hydraulic motor 3.

Figure 1:
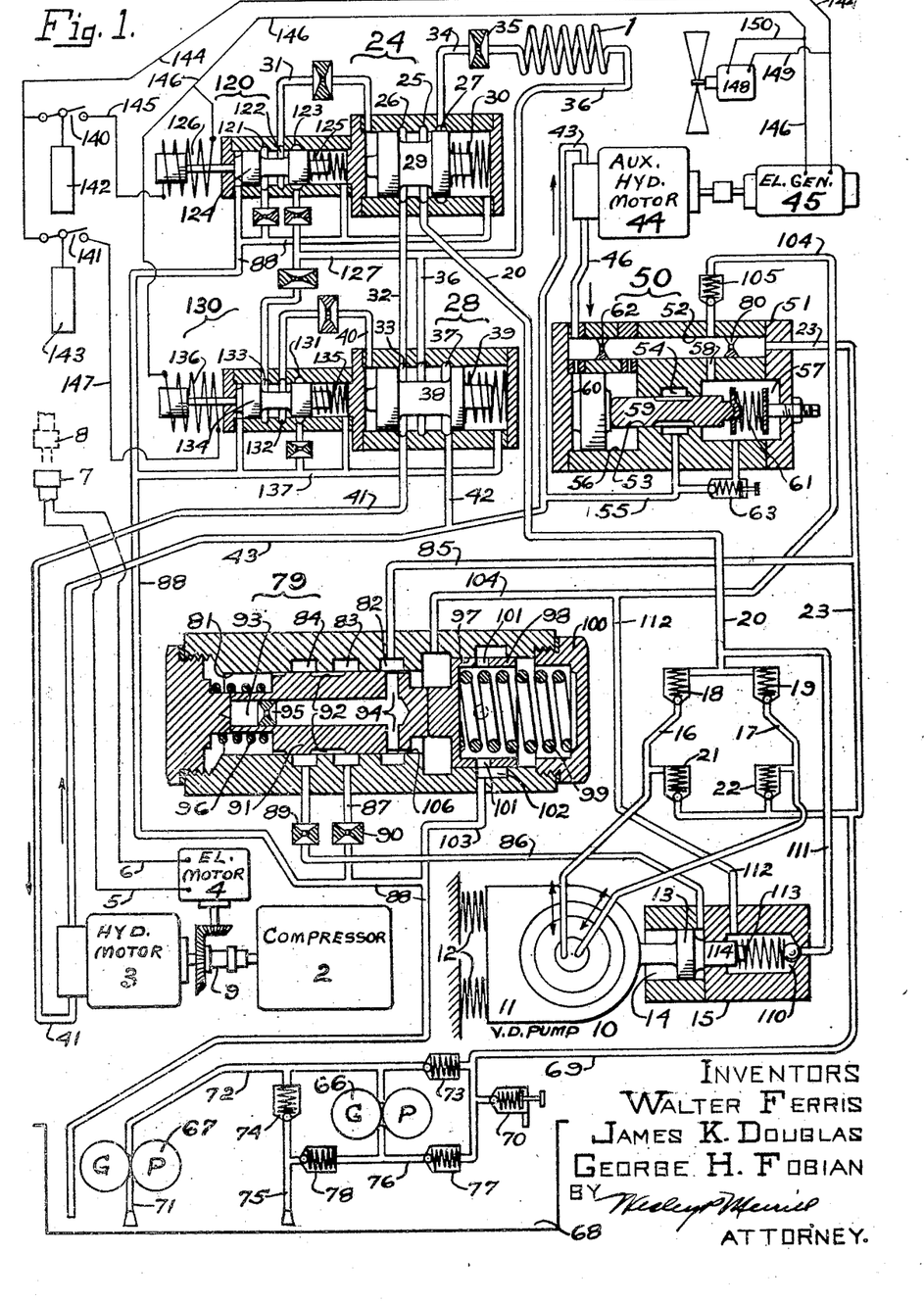
Fig. 1 is a diagram of the hydraulic circuit and shows the several parts thereof in the positions occupied when the transmission is idle.
Figure 3:
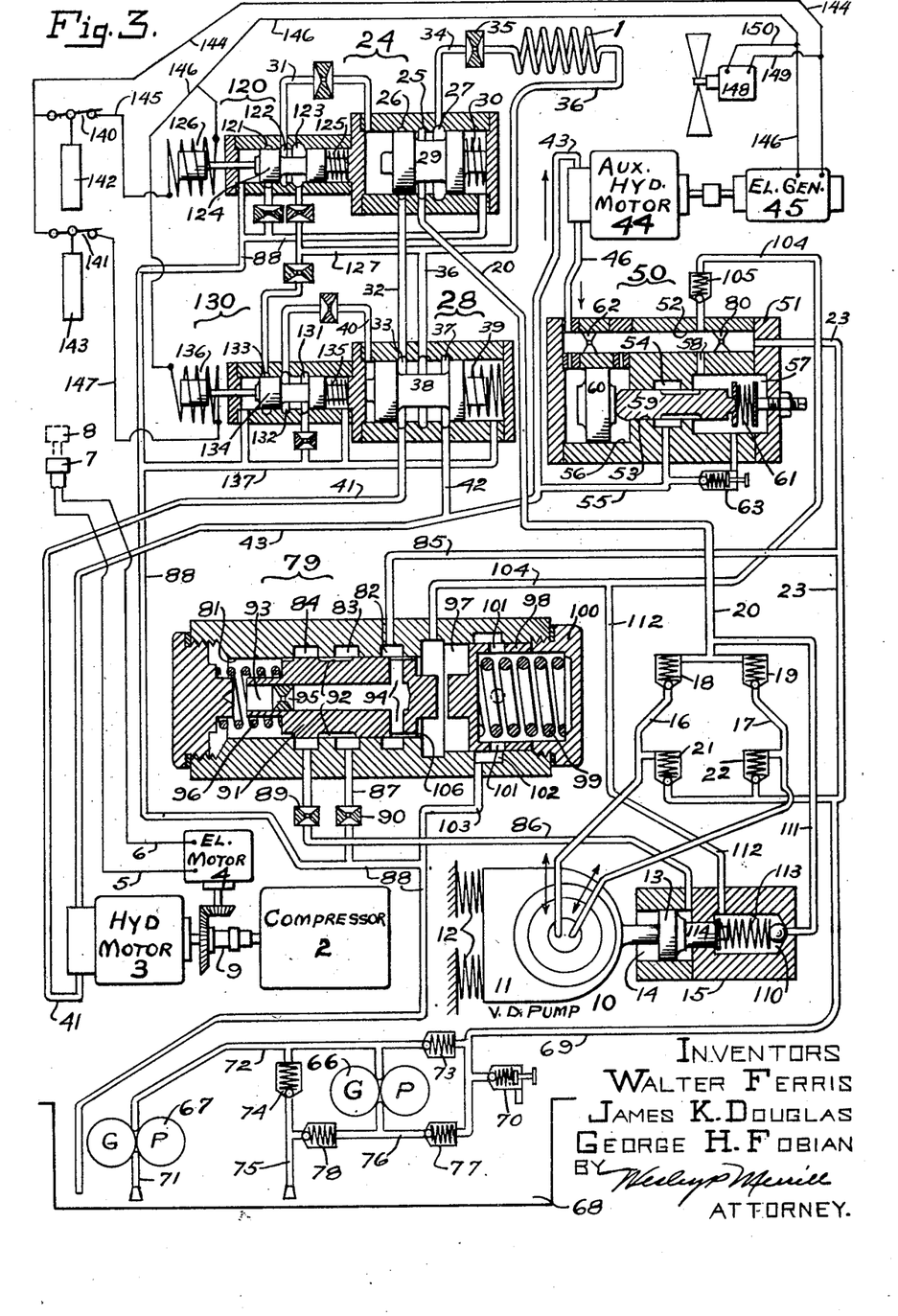
Fig. 3 is a similar diagram showing the several parts of the transmission in the positions occupied when the pump is supplying liquid to the heating coils and the displacement of the pump is being maintained substantially constant.

The flow of liquid through the valve 24 is controlled by its plunger 29 which is urged toward the left to the position shown in Fig. 1 by a spring 30 and is adapted to be moved toward the right into the position shown in Fig. 3 by liquid delivered to the left end of the valve casing through a pipe 31 as will presently be explained.

The port 26 is connected by a pipe 32 to an annular port 33 formed in the casing of the control valve 28. The port 27 is connected to the inlet end of the heating coil 1 by a pipe 34 which has a restriction such as an orifice choke 35 arranged therein to cause the energy in the oil forced therethrough to be transformed into heat to heat the oil. The discharge end of the coil 1 is connected by a pipe 36 to the casing of the control valve 28 at a point between the port 33 and a similar port 37.

When the plunger 29 of the selector valve 24 is in the position shown in Fig. 1, liquid discharged by the pump 10 flows through the valve casing to the control valve 28. When the plunger 29 is in the position shown in Fig. 3, liquid discharged by the pump 10 flows through the valve casing and the pipe 34 to the heating coil 1.

Figure 2:
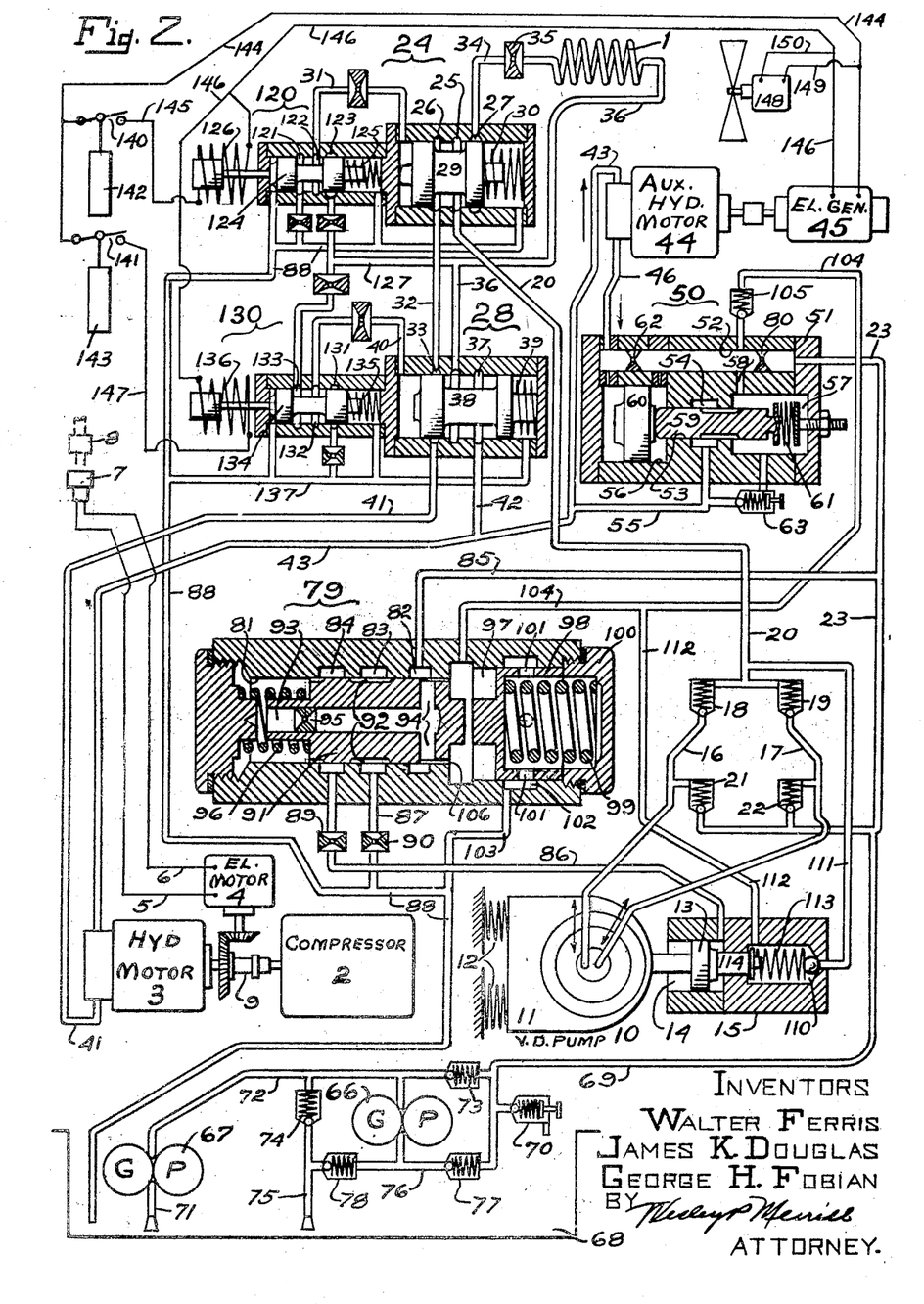
Fig. 2 is a similar diagram showing the several parts of the transmission in the positions occupied when the main hydraulic motor is driving the compressor of the refrigerating apparatus and the displacement of the pump is being increased.

The flow of liquid through the control valve 28 is controlled by its plunger 38 which is urged toward the left to the position shown in Fig. 1 by a spring 39 and is adapted to be moved toward the right into the position shown in Fig. 2 by liquid supplied to the left end of the valve casing through a pipe 40 as will presently be explained.

The port 33 of the control valve 28 is connected to the inlet of the hydraulic motor 3 by a pipe 41. The port 37 is connected by a pipe 42 to a pipe 43 intermediate the ends thereof. The pipe 36 is thus in constant communication with the pipe 43 through the pipe 42 irrespective of the position of the valve plunger 38.

The pipe 43 has one of its ends connected to the outlet port of the motor 3 and its other end connected to the inlet port of an auxiliary hydraulic motor 44 which drives an electric generator 45 and discharges into a pipe 46.

The motor 44 is thus connected in series with the motor 3 but it is smaller so that it would run faster if the entire discharge from the motor 3 passed through it. Therefore, in order to limit the speed of the auxiliary motor 44, it is necessary to by-pass a part of the liquid directed toward it.

This is accomplished by means of a motor speed controller 50 which is provided with a casing 51 having formed therein a longitudinal passage 52 to one end of which the pipe 46 is connected and to the other end of which the return pipe 23 is connected.

The casing 51 has a valve bore 53 formed therein parallel to the passage 52 and encircled intermediate its ends by an annular port 54 which is connected by a pipe 55 to the pipe 43 intermediate the ends thereof.

The valve bore 53 communicates at one of its ends with a cylinder 56 and at its other end with a counterbore 57 both of which are ordinarily formed in the casing 51 concentric with the bore 53. The counterbore 57 communicates with the passage 52 near the outlet end thereof through an unrestricted passage 58 and thereby provides a series of channels through which liquid may flow from the pipe 46 to the return pipe 23.

The flow of liquid through these channels is controlled by a valve 59 which is closely fitted in the bore 53 and has one of its ends extending into the cylinder 56 and its other end extending into the counterbore 57. One end portion of the valve 59 provides a seal between the port 54 and the cylinder 56 at all times and the other end portion provides a seal between the port 54 and the counterbore 57 when the valve is shifted at a sufficient distance toward the left.

Intermediate its end portions, the valve 59 is provided with suitable grooves which are long enough to permit liquid to flow from the port 54 to the counterbore 57 and which are shaped to throttle the flow.

The valve 59 is urged toward the right to open communication between the port 54 and the counterbore 57 by a piston 60, which is closely fitted in the cylinder 56, and it is urged toward the left to close communication between the port 54 and the counterbore 57 by a helical compression spring 61 arranged in the counterbore 57 between the end of the valve and the end of an adjusting screw threaded through the end of the casing.

The piston 60 is actuated in response to variations in the drop in pressure across an orifice choke 62 which is arranged in the discharge passage 52 near the inlet end thereof and provided with an orifice through which the entire discharge of the motor 44 must pass. The choke 62 is ordinarily so arranged in the passage 52 that it may be readily removed and replaced by a choke having a different size orifice in order to adjust the speed of the motor.

The pressures prevailing upon opposite sides of the choke 62 are transmitted to opposite ends of the piston 60 through two passages which are ordinarily restricted to prevent the valve 59 from hunting and which are arranged upon opposite sides of the choke 62 and communicate with opposite ends of the cylinder 56.

When the transmission stops, the spring 61 moves the valve 59 toward the left and closes the port 54 to the counterbore 57 as shown in Fig. 1. Then, when the transmission is started, the entire volume of liquid flowing in the pipe 43 is at first directed to the auxiliary motor 44 and tends to drive it at a speed proportional to the rate of flow in the pipe 43.

As the motor 44 attains speed, the flow through the passage 52 increases and causes a drop in pressure across the choke 62. The pressure prevailing at the left of the choke 62 will extend into the left end of the cylinder 56 and exert a force upon the left end of the piston 60, and the pressure prevailing at the right of the choke 62 will extend into the right end of the cylinder 56 and exert a force against the right end of the piston 60. The pressure prevailing at the right of the choke 62 will also extend through the passage 58 into the counterbore 57 so that both ends of the valve 59 are subjected to the same pressure.

As the motor speed continues to increase, the velocity of the liquid discharged therefrom will continue to increase and cause the drop in pressure across the choke 62 to increase until the force exerted against the piston 60 by the liquid at the left of the choke 62 becomes great enough to move the piston 60 and the valve 59 toward the right against the forces exerted against the right end of the piston 60 by the spring 61 and by the pressure prevailing at the right of the choke 62.

Shifting the valve 59 toward the right opens the port 54 to the counterbore 57, as shown in Fig. 2, thereby permitting liquid to flow from pipe 43 through the pipe 55, the port 54, the counterbore 57 and the passages 58 and 52 to the return pipe 23 at a rate determined by the distance the valve 59 is opened. The valve 59 throttles the flow therethrough in order to limit it and to maintain adequate pressure in the pipe 43.

The hydraulic force exerted upon the left end of the piston 60 in excess of the hydraulic force exerted on the right end thereof opposes the force of the spring 61 and causes the valve 59 to float in a balanced condition between these two forces. In this position, the valve 59 by-passes all liquid in excess of the liquid required to drive the motor 44 at a predetermined speed which is determined jointly by the area of the orifice in the choke 62 and the resistance of the spring 61.

A change in the rate at which liquid flows through the pipe 43 or a change in the load on the motor 44 will cause a momentary change in the rate of flow through the motor 44 and consequently through the choke 62. This change in flow initiates almost instantly a readjustment of the valve 59 to such a position that the rate at which liquid is by-passed is varied in proportion to the change in flow, thereby causing the motor to continue to operate at substantially the predetermined speed.

In order to limit the pressure of the liquid delivered to the auxiliary motor 44 when liquid is being supplied thereto by the main motor 3, which at this time is driven by the electric motor 4 and is functioning as a pump, a relief valve 63 is provided. As shown, the relief valve 63 has its inlet connected to the pipe 55 and its outlet connected to the counterbore 57.

Liquid for operating the controls and for supercharging the pump 10 when the car is in transit is provided by a gear pump 66 which is driven in unison with the pump 10 and is ordinarily arranged in the casing therewith as substantially a part thereof according to the usual practice.

Liquid for operating the controls and for supercharging the motor 3 is provided by a gear pump 67 when the car is stationary and the motor 3 is being driven by the electric motor 4 and is functioning as a pump. The gear pump 67 is driven in unison with the motor 3 and is ordinarily arranged in the casing therewith as substantially a part thereof, the motor 3 ordinarily being substantially the same as the pump 10 except that it is not adjustable to vary its displacement.

The gear pumps 66 and 67 draw liquid from a reservoir 68 and discharge it into a low pressure supply pipe 69 which is connected to the return pipe 23 intermediate the ends thereof. All liquid discharged by the gear pumps in excess of requirements is discharged into the reservoir 68 through a low pressure relief valve 70 which is connected to the pipe 69 and which enables either of the gear pumps to maintain a low pressure in the return side of the circuit.

Since the gear pump 67 is driven in unison with the motor 3, it always operates in the same direction and delivers liquid in the same direction. Since the gear pump 66 is driven in unison with the pump 10 in one direction or the other, and therefore delivers liquid in one direction or the other depending upon the direction of car movement, it is necessary to provide for directing its output into the pipe 69 in either direction of pump actuation.

As shown, the gear pump 67 draws liquid from the reservoir 68 through a suction pipe 71 and discharges it into a pipe 72 which is connected through a check valve 73 to the low pressure supply pipe 69 and through a check valve 74 to a pipe 75 through which the gear pump 66 draws liquid from the reservoir 68. The gear pump 66 has one of its ports connected to the pipe 72 and its other port connected to a pipe 76 which is connected to the pipe 69 through a check valve 77 and to the pipe 75 through a check valve 78.

The gear pump 66 will draw liquid from the reservoir 68 through the pipe 75, check valve 78 and pipe 76 and discharge it through the pipe 72 and check valve 73 into the pipe 69 in one direction of pump actuation, and it will draw liquid from the reservoir 68 through the pipe 75, check valve 74 and pipe 72 and discharge it through the pipe 76 and check valve 77 into the pipe 69 in the other direction of pump actuation.

One function of the pump 66 is to supply liquid for operating the servo-motor 13—14 to change the displacement of the pump 10. The flow of liquid to and from the servo-motor is controlled by a valve 79 which is operated in response to variations in the rate at which the pump 10 forces liquid through the hydraulic circuit as reflected by the drop in pressure across an orifice choke 80 which for convenience is ordinarily arranged in the passage 52 of the motor speed controller 50 between the entrance to the passage 58 and the entrance to the return pipe 23.

The valve 79 has an axial bore 81 formed in its casing and three ports 82, 83 and 84 formed in the wall of this bore. The port 82 is connected by a pipe 85 to the return pipe 23 intermediate the ends thereof, the port 84 is connected by a pipe 86 to the head end of the cylinder 14, and the port 83 is connected by a pipe 87 to a drain pipe 88 which discharges into the reservoir 68. The pipes 86 and 87 have chokes 89 and 90 connected therein, respectively, to restrict the flow of liquid to and from the cylinder 14 to thereby prevent the stroke of the pump from being changed too suddenly.

The flow of liquid through the valve 79 is controlled by a valve member or plunger 91 which is closely fitted in the bore 81 and provided in its peripheral surface intermediate its ends with a plurality of longitudinal grooves 92 through which liquid may flow from the port 84 to the port 83 when the plunger 91 is urged toward the left as shown in Fig. 1. Suitable grooves are also formed in the peripheral surface of the valve plunger 91 at the left end thereof to limit the flow of liquid from the left end of the bore 81 to the port 84.

The valve plunger 91 has an axial duct 93 extending inward from the left end thereof into communication with a plurality of radial ducts 94 which communicate with the port 82 in any position of the valve plunger. The duct 93 has a choke 95 arranged therein to limit the rate of flow therethrough to thereby prevent the piston 13 and slide block 11 from hunting.

The left end of the plunger 91 is thus exposed to the pressure prevailing in the return pipe 23. This pressure urges the plunger 91 toward the right with a force which is constant and proportional to the resistance of the gear pump relief valve 70. The valve plunger 91 is also urged toward the right by a light spring 96 arranged in the left end of the bore 81 and reacting against a plug which closes the end of the bore 81 and serves as a stop to limit the distance the valve plunger 91 may move toward the left.

The bore 81 is open at its right end to a counterbore 97 which is considerably greater in cross-sectional area and has a hollow piston 98 fitted therein. The piston 98 is urged toward the left by a helical compression spring 99 which is arranged inside the piston 98 and reacts against a plug 100 which closes the right end of the counterbore 97.

In order that the piston 98 may not have its movement hampered by liquid or gas trapped in the counterbore 97, it has a plurality of openings 101 formed in its side wall and communicating at all times with an annular port 102 which is formed in the wall of the counterbore and connected by a pipe 103 to the drain pipe 88.

The left end of the counterbore 97 is connected by a pipe 104 to the passage 52 at a point between the chokes 62 and 80 so that the piston 98 and the end of the plunger 91 are subjected to the pressure prevailing therein. This pressure is great enough to hold the piston 98 in retracted position. The pipe 104 has connected therein a check valve 105 which permits liquid to flow from the passage 52 to the counterbore 97 but prevents it from flowing in the opposite direction.

In order that liquid may escape from between the plunger 91 and the piston 98 when the plunger moves toward the right, one or more small grooves 106 are formed in the surface of the plunger 91 and extend longitudinally thereof far enough to provide communication between the port 82 and the counterbore 97. When the plunger 91 moves toward the right, liquid is ejected from between it and the piston 97 through the grooves 106 and the port 82 into the pipe 85.

If it were not for the grooves 106, the entire volume of liquid discharged by the pump 10 would flow through the choke 80. As it is, there is a constant limited flow through the grooves 106 from the pipe 104 to the pipe 85 so that this flow is by-passed around the choke 80. Therefore, the area of the orifice in the choke 80 must be determined in view of the flow through the grooves 106. However, the flow through the grooves 106 is so small that it has no appreciable effect upon the operation of the apparatus and, hence, it will be disregarded in the explanation hereinafter given.

Since the left end of the plunger 91 is exposed to the pressure prevailing in the return pipe 23 and since the right end of the plunger 91 is exposed to the pressure prevailing in the passage 52, the plunger 91 is urged toward the left against the resistance of the spring 96 by a force which is proportional to the difference between the pressures prevailing upon opposite sides of the choke 80. The spring 96 has its tension adjusted to counterbalance this force and hold the plunger 91 in position to substantially close the port 84 when the motor 3 is operating at the desired speed. That is, the plunger 91 floats in a balanced condition between the two forces. The motor speed may be varied through a narrow range by adjusting the tension of the spring 96, and it may be varied through a wider range by replacing the choke 80 by a choke having a different size orifice.

Variation in the speed of the car will cause a variation in the speed of the pump 10 and a resultant momentary variation in the rate of pump delivery. A variation in the rate of pump delivery will cause a variation in the velocity of the liquid flowing in the circuit and a variation in the speed of the motor 3. A variation in the velocity of the liquid will cause a variation in the drop in pressure across the choke 80.

When the car speed increases with the resultant increase in the velocity of the liquid, the pressure in the pipe 104 will increase and move the plunger 91 toward the left and thereby open the port 84 to the port 83 so that the springs 12 may move the slide block 11 toward the right to decrease pump displacement and the piston 13 may eject liquid from the cylinder 14 through the pipe 86, the ports 84 and 83, and the pipe 87 into the drain pipe 88.

The displacement of the pump 10 will be reduced until the motor 3 is operating at the desired speed at which time the pressure in the pipe 104 will have dropped sufficiently to permit the spring 96 to move the plunger 91 toward the right to close the port 84 to the port 83, thereby trapping liquid in the cylinder 14 to maintain the adjustment of the pump 10.

When the car speed decreases with the resultant decrease in the velocity of the liquid, the pressure in the pipe 104 will decrease and permit the spring 96 to move the plunger 91 toward the right and thereby open the port 84 to the left end of the bore 81 so that liquid may flow from the pipe 23 through the pipe 85, the ducts 94 and 93 to the left end of the bore 81 and then through the port 84 and the pipe 86 to the right end of the cylinder 14 and move the piston 13 and the slide block 11 toward the left to increase the displacement of the pump and thereby increase pump delivery.

The displacement of the pump 10 will be increased until the motor 3 is operating at the desired speed, at which time the pressure in the pipe 104 will have increased sufficiently to overcome the resistance of the spring 96 and move the plunger 91 toward the left to close the port 84, thereby trapping liquid in the cylinder 14 to maintain the adjustment of the pump 10.

In order to prevent the pump 10 from becoming overloaded, it is provided with a relief valve 110 which is shown as having its inlet connected to the supply pipe 29 by a pipe 111 and its outlet connected to the pipe 104 by a pipe 112.

Since the same torque applied to the pump will enable it to create a higher pressure at a short stroke than at a longer stroke, provision is ordinarily made for varying the resistance of the relief valve 110 in accordance with variations in pump displacement.

As shown, the relief valve 110 is arranged in the servo-motor casing 15 in alinement with the cylinder 14, and the spring 113 of the relief valve reacts against a stem 114 which is movable with the piston 13 and is closely fitted in the casing 15 to prevent the escape of liquid from the cylinder 14.

When the slide block 11 moves toward the right to decrease pump displacement, the stem 114 compresses the spring 113 and thereby increases the resistance thereof. When the slide block 11 moves toward the left to increase pump displacement, the stem 114 permits the spring 113 to expand and thereby decreases the resistance thereof.

The arrangement is such that the relief valve 110 will open only at a high pressure, for instance 2000# per sq. in., when the pump is operating at a minimum stroke but it will open at a lower pressure, for instance 900# per sq. in., when the pump is operating at maximum stroke.

If the pressure should exceed the maximum determined by the resistance of the spring 113, the relief valve 110 would open and permit liquid to flow from the pipe 111 to flow therethrough and through pipes 112 and 104 to the valve 79 and move the plunger 91 thereof toward the left and thereby permit the springs 12 to reduce pump displacement as previously explained.

Operation of the selector valve 24 is controlled by a pilot valve 120 having three ports 121, 122 and 123 formed in its casing and controlled by a valve member or plunger 124 which is urged toward the left to the position shown in Fig. 1 by a spring 125 and is adapted to be moved toward the right to the position shown in Fig. 3 by a solenoid 126 to which it is connected.

In order that movements of the plungers 29 and 124 of the selector and pilot valves may not be hampered by entrapped liquid or gas, the right end of the selector valve casing and both ends of the pilot valve casing are connected to branches of the drain pipe 88.

The port 121 is connected to another branch of the drain pipe 88, the port 122 is connected to the pipe 31 through which liquid is delivered to the selector valve for operating it, and the port 123 is connected to one branch of a pipe 127 which is connected to the pipe 36 intermediate the ends thereof.

Whenever the transmission is in operation, the resistance of the auxiliary motor 44 causes pressure to be created in the pipe 43. This pressure extends through the pipe 42, the casing of the control valve 28, and pipe 36 to the pipe 127 so that, when the pilot valve plunger 124 is shifted toward the right to the position shown in Fig. 3, liquid may flow from the pipe 127 through the pilot valve 120 and the pipe 31 to the selector valve 24 and shift its plunger 29 toward the right to the position shown in Fig. 3.

When the pilot valve plunger 124 is returned to the position shown in Fig. 1, port 122 is opened to port 121 and the spring 30 may move the plunger 29 toward the left and cause it to eject liquid from the left end of the selector valve casing through the pipe 31 and the pilot valve 120 into the drain pipe 88.

Operation of the control valve 28 is controlled by a pilot valve 130 having three ports 131, 132 and 133 formed in its casing and controlled by a valve member or plunger 134 which is urged toward the left to the position shown in Fig. 1 by a spring 135 and is adapted to be moved toward the right to the position shown in Fig. 2 by a soleniod 136 to which it is connected.

In order that movement of the plungers 38 and 134 of the control and pilot valves may not be hampered by entrapped liquid or gas, the right end of the control valve casing and both ends of the pilot valve casing are connected to branches of a drain pipe 137 which is connected to the drain pipe 88 intermediate the ends thereof.

The port 131 is connected to another branch of the drain pipe 137, the port 132 is connected to the pipe 40 through which liquid is delivered to the control valve for operating it, and the port 133 is connected to the other branch of the pipe 127.

When the pilot valve plunger 134 is in the position shown in Fig. 2, liquid may flow from the pipe 127 through the pilot valve 130 and the pipe 40 to the control valve 28 and shift its plunger 38 toward the right to the position shown in Fig. 2.

When the pilot valve plunger 134 is moved to the position shown in Fig. 3, port 132 is opened to the port 131 and the spring 39 may move the plunger 38 toward the left and cause it to eject liquid from the left end of the control valve casing through the pipe 40 and the pilot valve 130 into the drain pipe 137.

In order that the plungers of the valves 24, 28, 120 and 130 may not operate too rapidly, suitable chokes are provided. If a single orifice choke should be employed to limit the rate of movement of each plunger, the orifice therein would be so small that it would become clogged by foreign matter carried by the oil. As shown, the movement of each plunger in each direction is limited by two chokes arranged in series.

The solenoids 126 and 136 are operated by electric current supplied thereto by the generator 45 under the control, respectively, of electric switches 140 and 141 which are operated, respectively, by thermostats 142 and 143 arranged within the interior of the refrigerator car.

The switch 140 has one of its terminals connected to one terminal of the generator 45 by a conductor 144 and its other terminal connected by a conductor 145 to one end of the winding of the solenoid 126 the other end of which is connected to the other terminal of the generator 45 by a conductor 146. The switch 141 has one of its terminals connected to the conductor 144 and its other terminal connected by a conductor 147 to one end of the winding of the solenoid 136 the other end of which is connected to the conductor 146.

The thermostats 142 and 143 respond to variations in the temperature within the refrigerator car and open and close the switches 140 and 141 to direct liquid to the heating coil 1, or to the hydraulic motor 3, or to neither.

The generator 45 also supplies current for driving a plurality of electric fans 148 which circulate air over or through the heating and cooling units when the transmission is in operation. Since the present invention resides in the drive for the air conditioning apparatus and not in that apparatus per se, only one of the fans 148 has been shown. This fan is shown connected to the conductors 144 and 146, respectively, by conductors 149 and 150.

Operation

Assuming that the car is stationary and that the temperature therein is too high, the several parts of the transmission will be in the positions shown in Fig. 1.

When motion is imparted to the car, the pumps 10 and 66 will be driven from the car axle. The gear pump 66 will immediately deliver oil into the pipe 69, thereby creating pressure therein, but the pump 10 will not deliver any oil at first for the reason that it is at zero stroke.

The oil delivered by the gear pump 66 into the pipe 69 will flow therethrough and through the pipe 23, passage 52, check valve 105 and pipe 104 to the left end of the counterbore 97 and act upon the adjacent ends of the piston 98 and the valve plunger 91, and it will move the piston 98 toward the right to the position shown in Fig. 2 for the reason that the cross-sectional area of the piston 98 is great enough to enable the gear pump pressure to overcome the resistance of the spring 99.

The pressure created by the gear pump 66 will extend through the pipes 23 and 85 and the ducts 94 and 93 to the left end of the bore 81 in the valve 79 and act upon the left end of the plunger 91, thereby subjecting both ends of the plunger 91 to the same pressure and enabling the spring 96 to move the plunger 91 toward the right to open the port 84 to the left end of the bore 81 as shown in Fig. 2.

Oil delivered by the gear pump into the pipe 69 may then flow through the pipes 23 and 85, the valve 79 and the pipe 86 to the cylinder 14 and move the piston 13 and the slide block 11 toward the left and thereby cause the pump 10 to deliver oil into either the pipe 16 or the pipe 17 depending upon the direction of car movement.

When the pump 10 starts to deliver oil into the supply pipe 20, the motor 3 will not be started immediately due to the fact that it is by-passed by the plunger 38 of the control valve 28 being in the position shown in Fig. 1, but liquid may flow from pipe 20 through valve 24, pipe 32, valve 28 and pipes 42 and 43 to the auxiliary motor 44 to start it.

The resistance of the motor 44 will cause liquid to flow from the valve 28 through pipes 36 and 127, pilot valve 130 and pipe 40 to the left end of the casing of valve 28 and move its plunger 38 toward the right to the position shown in Fig. 2, thereby connecting the motor 3 in series with the pump 10.

Due to the throttling effect of the chokes 89 and 95 and the grooves in the left end of the plunger 91, the slide block 11 will move slowly. Consequently, when the pump 10 starts to deliver oil into the pipe 20, it is at short stroke and is therefore able to create a high pressure to overcome the static inertia and friction of the motors 3 and 44 and the mechanisms driven thereby.

Since the car is at first moving at slow speed, so that the pump 10 is being driven at slow speed, the slide block 11 will continue to move toward the left until the pump 10 is at full stroke.

The oil discharged by the pump 10 will flow through the pipe 20, the selector valve 24 via the ports 25 and 26, the pipe 32, the control valve 28 via the port 33, the pipe 41, the motor 3, the pipe 43, the auxiliary motor 44, the pipe 46, the passage 52, the return pipe 23 and the pipe 17 or 16 back to the pump 10.

As the car speed increases with the resultant increase in pump speed, the volumetric delivery of the pump 10 will be increased and thereby increase the speed of the motors 3 and 44. The entire output of the pump 10 will flow through the auxiliary motor 44 until that motor is driving the generator 45 at its rated speed and then the drop in pressure across the orifice choke 62 will be sufficient to operate the speed controller 50 which will then bypass all of the oil delivered by the pump 10 in excess of that required to drive the auxiliary motor 44 at the desired speed as previously explained.

As the car speed continues to increase with the resulting increase in pump delivery, the speed of the motor 3 will continue to increase until it is driving the compressor 2 at its rated speed. In practice, the compressor 2 attains its rated speed at a low car speed, for instance 18 miles per hour, and the auxiliary motor 44 is so proportioned that the generator 45 will attain its rated speed at a lower car speed, for instance 9 miles per hour.

When the motor 3 is driving the compressor 2 at the desired speed, the pressure differential across the orifice choke 80 is sufficient to move the valve plunger 91 to its central position, as shown in Fig. 3, where it covers the port 84 and floats in a balanced condition. A further increase in car speed will cause this pressure differential to increase and move the valve plunger 91 toward the left to open the port 84 to the port 83 and thereby permit the springs 12 to decrease pump displacement in proportion to the increase in car speed. The port 84 will remain open to the port 83 and the springs 12 will continue to decrease pump displacement as long as the car speed continues to increase.

When the car speed becomes constant, the pressure differential across the orifice choke 80 will become equal to the resistance of the spring 96 which will move the valve plunger 91 far enough to cover the port 84, as shown in Fig. 3, where it will float in a balanced condition as previously explained. Thereafter, any variation in car speed will cause the valve plunger 91 to move in one direction or the other to cause the pump displacement to be varied in proportion to variations in car speed and thereby maintain the motor speed constant as previously explained. It is to be understood that the valve plunger 91 does not ordinarily move very far from its central position except when the pump 10 is idle, the movement of the plunger 91 having been exaggerated in the drawings for clearness of illustration.

The motor 3 will continue to drive the compressor 2 until the temperature within the car has been reduced to a predetermined degree, for instance 35° F., and then the thermostat 143 will close the switch 141 to enable the generator 45 to energize the solenoid 136 which will shift the plunger 134 of the pilot valve 130 toward the right to the position shown in Fig. 3, thereby opening port 131 to port 132 and permitting spring 39 to shift the valve plunger 38 toward the left to the position shown in Fig. 3.

Shifting the valve plunger 38 to the position shown in Fig. 3 opens the port 37 to the port 33 and thereby bypasses the motor 3 which ceases to drive the compressor 2. The oil will then flow from the pipe 32 through the control valve 28 and the pipe 42 into the pipe 43, thereby causing the auxiliary motor 44 to continue to operate as formerly.

The valve 28 will continue to bypass the motor 3 until the temperature in the car exceeds a predetermined degree, for instance 37° F., at which time the thermostat 143 will open the switch 141 to deenergize the solenoid 136 and thereby permit the spring 135 to shift the valve plunger 134 toward the left to close the port 131 and open the port 133. Then oil will flow through the pilot valve and move the valve plunger 38 toward the right to close the port 33 and thereby cause the motor 3 to be energized and drive the compressor 2 to cool the car as previously described.

If the car is subjected to low temperatures and the temperature within the car drops to a predetermined minimum, for instance 33° F., the switch 141 will be operated first by the thermostat 143 to cause the motor 3 to be bypassed, and then the thermostat 142 will close the switch 140 to enable the generator 45 to energize the solenoid 126 which will shift the plunger 124 of the pilot valve 120 toward the right to the position shown in Fig. 3, thereby permitting oil to flow from the pipe 43 through the pipes 42, 36 and 127, ports 123 and 122 of the pilot valve 120 and pipe 31 to the left end of the valve 24 and shift its plunger 29 toward the right into the position shown in Fig. 2.

Shifting the plunger 29 of the selector valve to the position shown in Fig. 3 closes communication between the ports 25 and 26 and opens communication between the ports 25 and 27, thereby stopping the delivery of oil into the pipe 32 and directing it through the pipe 34 into the coil 1, the oil being heated as it is forced through the choke 35 to thereby provide the coil 1 with hot oil to heat the car. After passing through the coil 1, the oil flows through the pipe 36, valve 28 and pipe 42 into the pipe 43 so that the auxiliary motor 44 continues to be driven as formerly.

The pump 10 will continue to force its entire output through the choke 35 and coil 1 to heat the car until the temperature of the car is raised sufficiently, for instance to 35° F., and then the thermostat 142 will open the switch 140 to deenergize the solenoid 126 and permit the spring 125 to return the plunger 124 of the pilot valve 120 to its initial position and then the spring 30 will return the plunger 29 of the selector valve to its initial position, thereby directing the oil through the pipe 32 to the control valve 28.

The apparatus will thus function to either cool or heat the car in accordance with variations of the temperature therein during the time the car is in transit, oil will be delivered at a substantially constant rate to the motor 3 as a motive agent or to the heating coil as a heating agent when the car is moving at or above a predetermined low speed, and the generator 45 will be driven at a substantially constant speed when the car is moving at or above a predetermined lower speed.

When the car stops and thereby ceases to drive the pumps, the pressure in the circuit will drop substantially to zero and permit the spring 99 to move the piston 98 and plunger 91 of the valve 79 toward the left to the position shown in Fig. 1. With the plunger 91 in this position, port 84 is open to port 83 and the springs 12 may move the slide block 11 toward the right to its zero displacement position and cause the piston 13 to eject oil from the cylinder 14 through pipe 86, valve 79 and pipe 87 into drain pipe 88.

If, when starting the car, the oil in the transmission is thick and stiff due to the car remaining stationary and the transmission remaining idle for a considerable period of time in subzero weather, the transmission will start readily when the car is moved for the reason that the pump 10 is at zero stroke so that the pump rotor simply rotates without tending to displace any of the oil and the gear pump 66 is so small that but little power is required to drive it.

The gear pump 66 will first break up the thick oil therein and impart heat thereto and then force the thick oil into the pipe 69. If the oil in the circuit is so thick that the gear pump cannot move it, the liquid discharged by the gear pump will be forced through the relief valve 70 and the energy stored in the oil will be transformed into heat.

Since the gear pump 66 is arranged within the same casing as the pump 10, the heat generated by the gear pump and at the relief valve 70 will heat the oil therein. Heat is also imparted to the oil by rotation of the rotor of the pump 10.

When the oil has been warmed slightly, it will flow very slowly to the valve 79 and operate it and then it will flow very slowly to the cylinder 14 and move the piston 13 and the slide block 11 slowly toward the left.

As the slide block 11 starts to move toward the left, the pistons of the pump 10 will at first discharge minute quantities of oil into the pipe 16 or the pipe 17 depending upon the direction of car movement. If the oil in the remote parts of the circuit is so thick and stiff that the pump 10 cannot move it, the pump will discharge through the relief valve 113, thereby further heating the oil.

The transmission will continue to operate in this manner until sufficient heat has been generated to liquefy the oil and then the transmission will operate in its normal manner as described above.

Since the greater part of the transmission is combined into a compact unit, the heat generated by the pumps 10 and 66 is quickly transmitted to other parts of the transmission to heat the oil therein. In practice, it is found that the transmission will function normally within a few minutes after having been started with the oil so cold and stiff that it is semisolid.

If the car needs to be cooled while stationary and the connector 7 is attached to the connector 8 of a stationary electric circuit, the electric motor 4 will be energized and drive the compressor 2 to cool the car. Since the motor 3 is direct-connected to the compressor 2, it will be driven in unison therewith and function as a pump to supply liquid for driving the auxiliary motor 44.

The gear pump 67, which is driven in unison with the motor 3, will draw liquid from the reservoir 68 and deliver a part of it into the return side of the circuit for control purposes and to maintain a low pressure therein in order that the speed controller 50 may function properly. Liquid discharged by the gear pump 67 in excess of these requirements is exhausted through the relief valve 70.

The hydraulic motor 3, when driven by the electric motor 4 and functioning as a pump, will discharge liquid into the pipe 43 and have liquid returned to it through the pipe 41. When it starts to function as a pump, the pipe 43 is open to the pipe 41 through pipe 42 and valve 28 so that the liquid is short circuited momentarily. However, liquid discharged by the gear pump 67 immediately flows through pipe 72, check valve 73, pipes 69 and 23, check valve 21 or 22, pipe 16 or 17, check valve 18 or 19, pipe 20, valve 24 and pipe 32 into valve 28 and creates pressure therein and in pipes 41, 42 and 43. From valve 28, liquid flows through pipes 36 and 127, pilot valve 130 and pipe 40 to the left end of valve 28 and moves the plunger 38 towards the right to close communication between pipes 41 and 42, thereby directing liquid from the motor 3 to the auxiliary motor 44 to cause it to drive the generator 45 which will then supply an electric current for operating the fans 148.

From the motor 44, the liquid will flow through the pipe 46 and passage 52 into the return pipe 23, and all liquid discharged by the motor 3 in excess of that required to drive the motor 44 at the desired speed will be bypassed through the pipe 55 and the speed controller 50 into the return pipe 23 in the manner previously described. From the return pipe 23, the liquid will flow through pipe 16 or 17, supply pipe 20, valve 24, pipe 32, valve 28, and pipe 41 back to the motor 3.

It will be noted that the pressure created by the motor 3 extends through pipes 42, 36 and 127, coil 1 and pipe 34 but there will be no flow therethrough due to the pipe 34 being blocked by the plunger 29 and the pipe 127 having one end blocked by plunger 124 and its other end open only to the left end of valve 28 the plunger 39 of which has previously been moved toward the right to the limit of its movement.

The electric motor 4 will continue to drive the compressor 2 as long as it is connected into the stationary electric circuit. After the car has been cooled to the desired degree, the refrigerant will be diverted from the car cooling coils to the coils in the brine tanks through which it may flow for a long period of time, thereby permitting the attendant to disconnect the motor 4 from the stationary circuit at his convenience.

The invention herein set forth is susceptible of various modifications and adaptations without departing from the scope thereof as hereafter claimed.

The invention is hereby claimed as follows:

1. The combination with an enclosed space, and air conditioning apparatus to cool said space, of a hydraulic motor for driving said apparatus, a radiator arranged within said space to cause liquid forced therethrough to heat said space, a pump, means for directing liquid from said pump to said motor and to said radiator selectively, and means for driving said pump.

2. The combination, with a vehicle, and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, and means for directing liquid from said pump to said motor and to said radiator selectively.

3. The combination, with a vehicle, and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, means for directing liquid from said pump to said motor and to said radiator selectively, and means for varying the displacement of said pump inversely to variations in the speed of said vehicle.

4. The combination, with a vehicle, and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, means for directing liquid from said pump to said motor and to said radiator selectively, and means responsive to variations in the velocity of the liquid circulated by said pump for varying pump displacement inversely to variations in the speed of said vehicle.

5. The combination, with a wheeled vehicle, and air conditioning apparatus carried by said vehicle to cool the interior thereof, of a hydraulic motor for driving said apparatus, a radiator carried by said vehicle to cause liquid forced therethrough to heat the interior of said vehicle, a pump, means for directing liquid from said pump to said motor and to said radiator selectively, and a drive connecting said pump to a wheel of said vehicle to drive said pump from said wheel.

6. The combination, with a wheeled vehicle, and air conditioning apparatus carried by said vehicle to cool the interior thereof, of a hydraulic motor for driving said apparatus, a radiator carried by said vehicle to cause liquid forced therethrough to heat the interior of said vehicle, a pump, means for directing liquid from said pump to said motor and to said radiator selectively, a drive connecting said pump to a wheel of said vehicle to drive said pump from said wheel, and means for varying pump displacement inversely to variations in wheel speed to thereby maintain pump delivery substantially constant within a wide range of wheel speeds.

7. The combination, with a wheeled vehicle, and air conditioning apparatus carried by said vehicle to cool the interior thereof, of a hydraulic motor for driving said apparatus, a radiator carried by said vehicle to cause liquid forced therethrough to heat the interior of said vehicle, a pump, means for directing liquid from said pump to said motor and to said radiator selectively, a drive connecting said pump to a wheel of said vehicle to drive said pump from said wheel, and means responsive to variations in the velocity of the liquid circulated by said pump for varying pump displacement inversely to variations in wheel speed to thereby maintain pump delivery substantially constant within a wide range of wheel speeds.

8. The combination, with a wheeled vehicle, and air conditioning apparatus carried by said vehicle to cool the interior thereof, of a hydraulic motor for driving said apparatus, a radiator carried by said vehicle to cause liquid forced therethrough to heat the interior of said vehicle, a pump, means for directing liquid to said motor and said radiator selectively, a drive connecting said pump to a wheel of said vehicle to drive said pump from said wheel, and means for directing the output of said pump in a given direction irrespective of the direction of wheel rotation.

9. The combination, with a vehicle and air conditioning apparatus carried by said vehicle for cooling the interior thereof, of a hydraulic motor for driving said apparatus, a radiator carried by said vehicle to cause liquid forced therethrough to heat the interior of said vehicle, a pump driven by motion imparted thereto from said vehicle, means for directing liquid from said pump to said motor and to said radiator selectively, an electric motor for driving said apparatus, and means for connecting said motor into a stationary electric circuit when said vehicle is stationary.

10. The combination, with an enclosed space, and air conditioning apparatus to cool said space, of a hydraulic motor for driving said apparatus, a heating unit arranged within said space and provided with a restricted passageway to cause liquid forced therethrough to have heat generated therein to heat said space, a pump, means for directing liquid from said pump to said motor and to said unit selectively, a variable speed drive for driving said pump, and fluid actuated means responsive to variations in the velocity of liquid circulated by said pump for varying pump displacement to thereby maintain pump output substantially constant within a wide range of driving speeds.

11. The combination, with an enclosed space, of a heating unit having a restricted passageway to cause liquid forced therethrough to generate heat in said unit to heat said space, a variable displacement pump for supplying liquid to said unit, means for driving said pump at varying speeds, and means responsive to variations in the velocity of the liquid delivered by said pump for varying pump displacement to thereby maintain the volumetric delivery of said pump approximately constant.

12. The combination, with an enclosed space, refrigerating apparatus for cooling said space, a hydraulic motor for driving said apparatus, and a variable speed source of power, of a variable displacement pump for supplying motive liquid to said motor connected to said source to be driven at varying speeds therefrom, said pump having a displacement varying member constantly urged toward zero displacement position, a hydraulic servo-motor for moving said member toward maximum displacement position, means for supplying motive liquid to said servo-motor to operate the same, and fluid actuated means responsive to variations in the velocity of the liquid discharged by said pump for controlling the flow of liquid to and from said servo-motor to thereby cause pump displacement to be varied inversely to variations in pump speed.

13. The combination, with an enclosed space, refrigerating apparatus for cooling said space, a hydraulic motor for driving said apparatus, and a variable speed source of power, of a variable displacement pump for supplying motive liquid to said motor connected to said source to be driven at varying speeds therefrom, said pump having a displacement varying member constantly urged toward zero displacement position, a hydraulic servo-motor for moving said member toward maximum displacement position, a constant displacement pump driven in unison with said variable pump for supplying motive liquid to said servo-motor to operate the same, and fluid actuated means responsive to variations in the velocity of the liquid discharged by said variable pump for controlling the flow of liquid to and from said servo-motor to thereby cause pump displacement to be varied inversely to variations in pump speed.

14. The combination, with an enclosed space, refrigerating apparatus for cooling said space, a hydraulic motor for driving said apparatus, and a variable speed source of power, of a variable displacement pump for supplying motive liquid to said motor connected to said source to be driven at varying speeds therefrom, said pump having a displacement varying member constantly urged toward zero displacement position, a hydraulic servo-motor for moving said member toward maximum displacement position, a source of control liquid, and means for directing control liquid from said source to said servo-motor to operate the same and including a valve operable in response to variations in the velocity of the liquid discharged by said pump for controlling the flow of control liquid to and from said servo-motor to thereby enable said servo-motor to move said member in a direction to increase pump displacement as pump speed decreases and to permit said member to move in a direction to decrease pump displacement as pump speed increases.

15. The combination, with a vehicle, apparatus carried by said vehicle and a hydraulic motor for driving said apparatus, of a variable displacement pump for supplying motive liquid to said motor, said pump being driven at varying speeds by motion imparted thereto from said vehicle and having a displacement varying member constantly urged toward zero displacement position, a hydraulic servo-motor for moving said member toward maximum displacement position, a constant displacement pump driven in unison with said variable pump for supplying liquid to said servo-motor to operate the same, and means for directing liquid from said constant displacement pump to said servo-motor and including a valve operabe in response to variations in the velocity of the liquid discharged by said variable pump for controlling the flow of liquid to and from said servo-motor to thereby enable said servo-motor to move said member in a direction to increase pump displacement as pump speed decreases and to permit said member to move in a direction to decrease pump displacement as pump speed increases.

16. The combination, with a vehicle, apparatus carried by said vehicle and a hydraulic motor for driving said apparatus, of a variable displacement pump for supplying motive liquid to said motor, said pump being driven at varying speeds by motion imparted thereto from said vehicle and having a displacement varying member constantly urged toward zero displacement position, a hydraulic servo-motor for moving said member toward maximum displacement position, a source of control liquid, means for directing control liquid from its source to said servo-motor to operate the same and including a valve operable in response to variations in the velocity of the liquid discharged by said pump for controlling the flow of control liquid to and from said servo-motor to thereby enable said servo-motor to move said member in a direction to increase pump displacement as pump speed decreases and to permit said member to move in a direction to decrease pump displacement as pump speed increases, spring means for shifting said valve to a position to permit said member to move in a direction to decrease pump displacement, and means operable by liquid supplied from said source for preventing said spring means from affecting the operation of said valve.

17. The combination, with a vehicle, apparatus carried by said vehicle and a hydraulic motor for driving said aparatus, of a variable displacement pump for supplying motive liquid to said motor, said pump being driven at varying speeds by motion imparted thereto from said vehicle and having a displacement varying member constantly urged toward zero displacement position, a hydraulic servo-motor for moving said member toward maximum displacement position, a constant displacement pump driven in unison with said variable pump for supplying liquid to said servo-motor to operate the same, means for directing liquid from said constant displacement pump to said servo-motor and including a valve operable in response to variations in the velocity of the liquid discharged by said variable pump for controlling the flow of liquid to and from said servo-motor to thereby enable said servo-motor to move said member in a direction to increase pump displacement as pump speed decreases and to permit said member to move in a direction to decrease pump displacement as pump speed increases, spring means for shifting said valve to a position to permit said member to move in a direction to decrease pump displacement, and means operable by liquid supplied by said constant ·displacement pump for preventing said spring means from affecting the operation of said valve.

18. The combination, with a vehicle having air conditioning apparatus, of a main hydraulic motor for driving said apparatus, a variable displacement pump for supplying liquid to said motor to drive the same, means for driving said pump from a turnable part of said vehicle, fluid actuated means responsive to variations in the velocity of the liquid delivered by said pump for varying pump displacement inversely to variations in pump speed, a gear pump driven in unison with said variable pump for supplying motive liquid to said fluid actuated means, an auxiliary hydraulic motor connected in series with said main motor, and means responsive to variations in the velocity of the liquid discharged from said auxiliary motor for by-passing around said auxiliary motor a part of the liquid discharged from said main motor to thereby govern the speed of said auxiliary motor independently of the speed of said main motor.

19. The combination, with a vehicle having air conditioning apparatus, of a main hydraulic motor for driving said apparatus, a variable displacement pump for supplying liquid to said motor to drive the same, means for driving said pump from a turnable part of said vehicle, fluid actuated means responsive to variations in the velocity of the liquid delivered by said pump for varying pump displacement inversely to variations in pump speed, a gear pump driven in unison with said variable pump for supplying motive liquid to said fluid actuated means, an auxiliary hydraulic motor connected in series with said main motor, means responsive to variations in the velocity of the liquid discharged from said auxiliary motor for bypassing around said auxiliary motor a part of the liquid discharged from said main motor to thereby govern the speed of said auxiliary motor independently of the speed of said main motor, and an electric motor connected to said main motor and adapted to be connected into a stationary electric circuit when said vehicle is stationary to drive said main motor and cause it to function as a pump and deliver liquid for driving said auxiliary motor.

20. The combination, with a vehicle having air conditioning apparatus, of a main hydraulic motor for driving said apparatus, a variable displacement pump for supplying liquid to said motor to drive the same, means for driving said pump from a turnable part of said vehicle, fluid actuated means responsive to variations in the velocity of the liquid delivered by said pump for varying pump displacement inversely to variations in pump speed, a gear pump driven in unison with said variable pump for supplying motive liquid to said fluid actuated means, an auxiliary hydraulic motor connected in series with said main motor, means responsive to variations in the velocity of the liquid discharged from said auxiliary motor for bypassing around said auxiliary motor a part of the liquid discharged from said main motor to thereby govern the speed of said auxiliary motor independently of the speed of said main motor, an electric motor connected to said main motor and adapted to be connected into a stationary electric circuit when said vehicle is stationary to drive said main motor and cause it to function as a pump and deliver liquid for driving said auxiliary motor, and a gear pump driven in unison with said main motor for maintaining pressure at the intake of said main motor and in said bypassing means.

21. The combination, with a vehicle and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, means for directing liquid from said pump to said motor and to said radiator selectively including a hydraulically operated selector valve, a pilot valve for controlling operation of said selector valve, and means responsive to variations in the temperature within said vehicle for operating said pilot valve.

22. The combination, with a vehicle and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, means for directing liquid from said pump to said motor and to said radiator selectively including a hydraulically operated selector valve, a control valve for controlling operation of said motor, a pilot valve for controlling operation of each of said valves, and means responsive to variations in the temperature within said vehicle for operating each of said pilot valves.

23. The combination, with a vehicle and air conditioning apparatus to cool the interior of said vehicle, of a hydraulic motor for driving said apparatus, a radiator arranged within said vehicle to cause liquid forced therethrough to heat the interior of said vehicle, a pump driven by motion imparted thereto from said vehicle, means for directing liquid from said pump to said motor and to said radiator selectively including a hydraulically operated selector valve, a control valve connected in series with said selector valve for controlling operation of said motor, a pilot valve for controlling operation of each of said valves, and means responsive to variations in the temperature within said vehicle for operating each of said pilot valves.

24. The combination, with a vehicle having apparatus for cooling the interior thereof, of a hydraulic motor for driving said apparatus, a pump for supplying motive liquid to said motor driven by motion imparted thereto from said vehicle, an auxiliary pump driven by motion imparted thereto from said vehicle, a hydraulically operated valve for controlling the delivery of liquid from said variable pump to said motor, yieldable means constantly urging said valve toward a position to bypass said motor, and means for directing liquid from said auxiliary pump to said valve to move it to a position to direct liquid to said motor.

25. The combination, with a vehicle having apparatus for cooling the interior thereof, of a hydraulic motor for driving said apparatus, a variable displacement pump for supplying motive liquid to said motor driven by motion imparted thereto from said vehicle, said pump having a displacement varying member constantly urged toward zero displacement position, an auxiliary pump driven by motion imparted thereto from said vehicle, a hydraulic servo-motor operated by liquid supplied thereto from said auxiliary pump for moving said displacement varying member toward maximum displacement position, means responsive to variations in the velocity of the liquid discharged by said variable pump for controlling the delivery of liquid to said servo-motor to thereby control pump delivery, a hydraulically operated valve for controlling the delivery of liquid from said variable pump to said motor, yieldable means constantly urging said valve toward a position to bypass said motor, and means for directing liquid from said auxiliary pump to said valve to move it to a position to direct liquid to said motor.

26. The combination, with a vehicle having apparatus for cooling the interior thereof, of a hydraulic motor for driving said apparatus, a pump for supplying motive liquid to said motor driven by motion imparted thereto from said vehicle, an auxiliary pump driven by motion imparted thereto from said vehicle, a hydraulically operated valve for controlling the delivery of liquid from said variable pump to said motor, yieldable means constantly urging said valve toward a position to bypass said motor, means for directing liquid from said auxiliary pump to said valve to move it to a position to direct liquid to said motor, a pilot valve for controlling the delivery of liquid from said auxiliary pump to said valve, and means responsive to variations in the temperature within said vehicle for operating said pilot valve.

27. The combination, with a vehicle having apparatus for cooling the interior thereof, of a hydraulic motor for driving said apparatus, a variable displacement pump for supplying motive liquid to said motor driven by motion imparted thereto from said vehicle, said pump having a displacement varying member constantly urged toward zero displacement position, an auxiliary pump driven by motion imparted thereto from said vehicle, a hydraulic servo-motor operated by liquid supplied thereto from said auxiliary pump for moving said displacement varying member toward maximum displacement position, means responsive to variations in the velocity of the liquid discharged by said variable pump for controlling the delivery of liquid to said servo-motor to thereby control pump delivery, a hydraulically operated valve for controlling the delivery of liquid from said variable pump to said motor, yieldable means constantly urging said valve toward a position to bypass said motor, means for directing liquid from said auxiliary pump to said valve to move it to a position to direct liquid to said motor, a pilot valve for controlling the delivery of liquid from said auxiliary pump to said valve, and means responsive to variations in the temperature within said vehicle for operating said pilot valve.

WALTER FERRIS.
JAMES K. DOUGLAS.
GEORGE H. FOBIAN.